United States Patent [19]

Baudouin

[11] 3,964,771
[45] June 22, 1976

[54] PUSH PULL CONNECTOR
[75] Inventor: Jean Pierre Baudouin, Evreux, France
[73] Assignee: Compagnie Deutsch, Saint Cloud, France
[22] Filed: Sept. 27, 1974
[21] Appl. No.: 509,832

[30] Foreign Application Priority Data
Oct. 19, 1973 France ............................ 73.37329

[52] U.S. Cl. ............................. 285/315; 285/330; 339/91 B
[51] Int. Cl.² ....................................... F16L 37/22
[58] Field of Search ............ 285/315, 316, 321, 81, 285/82, 86, 84, 330, 277, 305, DIG. 7; 339/91 B, DIG. 2

[56] References Cited
UNITED STATES PATENTS

| | | | |
|---|---|---|---|
| 2,383,439 | 8/1945 | Baer | 285/DIG. 7 |
| 2,565,572 | 8/1951 | Prangborn | 285/316 X |
| 3,077,330 | 2/1963 | Lamphear | 285/86 |
| 3,606,402 | 9/1971 | Medney | 285/305 |

FOREIGN PATENTS OR APPLICATIONS

| | | | |
|---|---|---|---|
| 484,768 | 5/1938 | United Kingdom | 285/315 |
| 281,971 | 5/1971 | U.S.S.R. | 285/315 |

*Primary Examiner*—Dave W. Arola
*Attorney, Agent, or Firm*—Darby & Darby

[57] ABSTRACT

A push — pull connector including a sleeve lockable to a spigot by locking balls controlled by a sliding member mounted on the sleeve, wherein the sliding member has a stable locked position and a stable unlocked position, with no intermediate stable position. The stable positions are determined by a resilient ring mounted in a groove on the sleeve and not by any spring action on the balls. The arrangement may be such that the force necessary to move the sliding member from unlocked to locked position is just greater than the force necessary to effect full engagement of the spigot and the sleeve.

10 Claims, 7 Drawing Figures

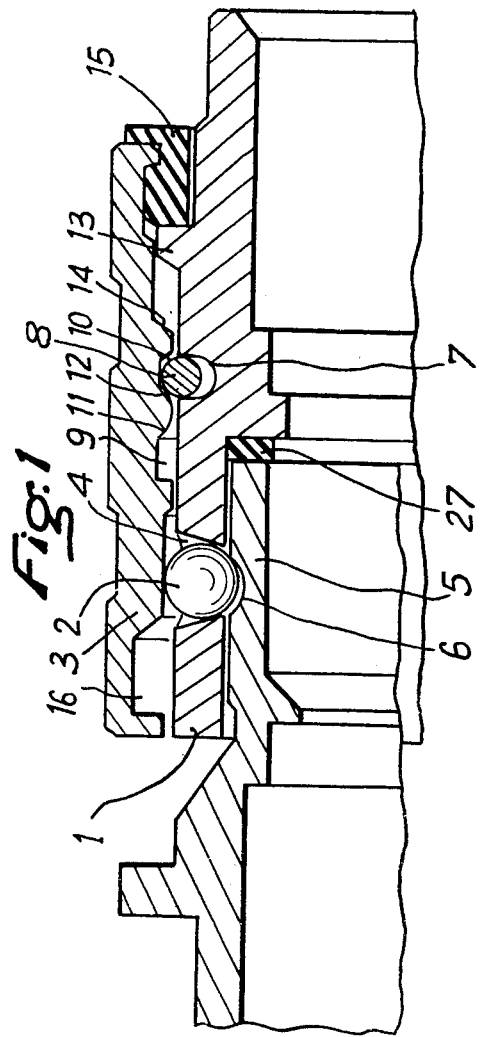
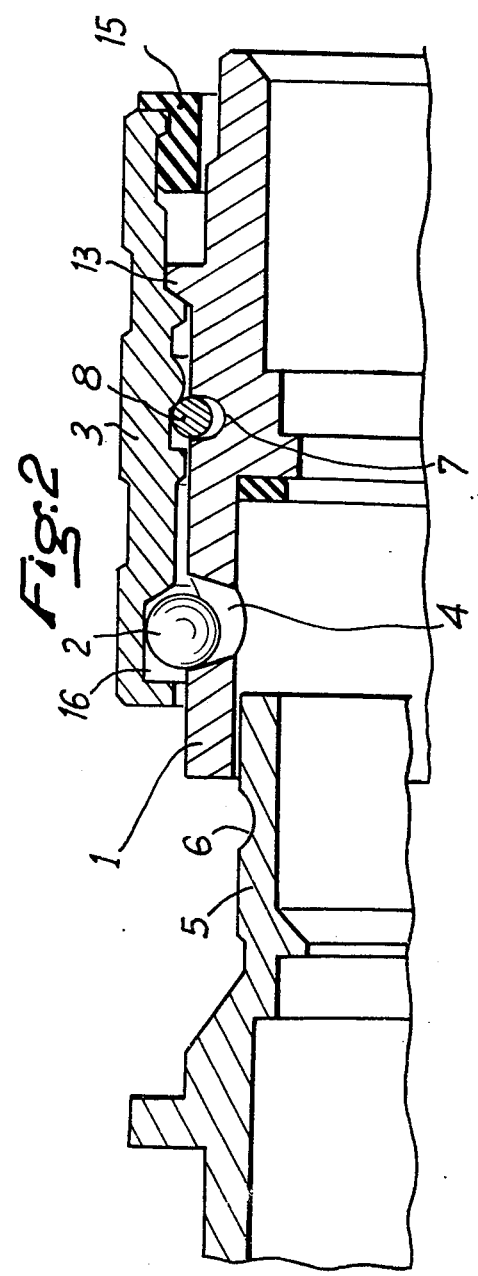

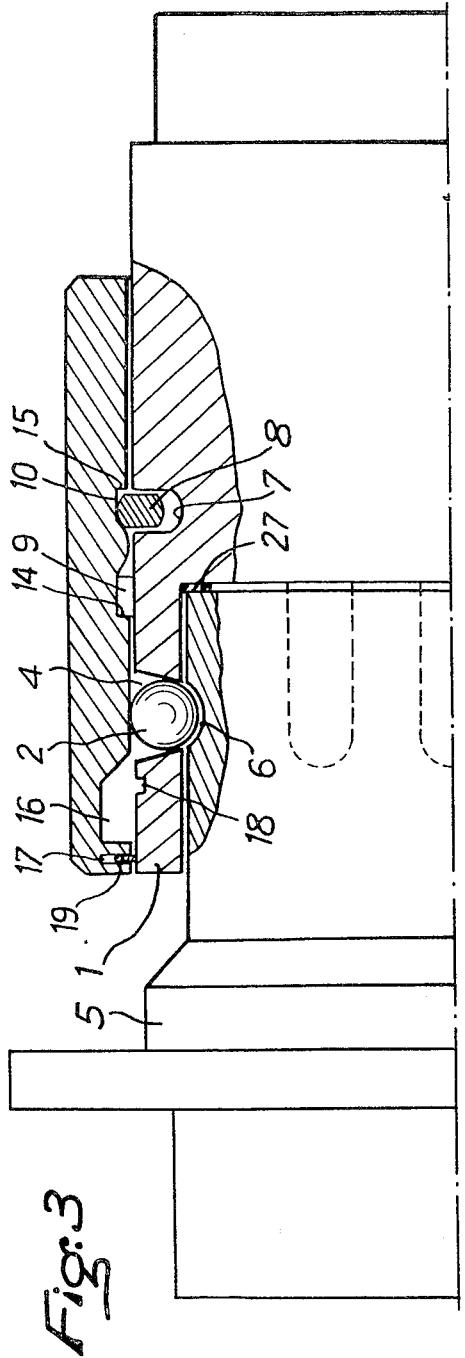
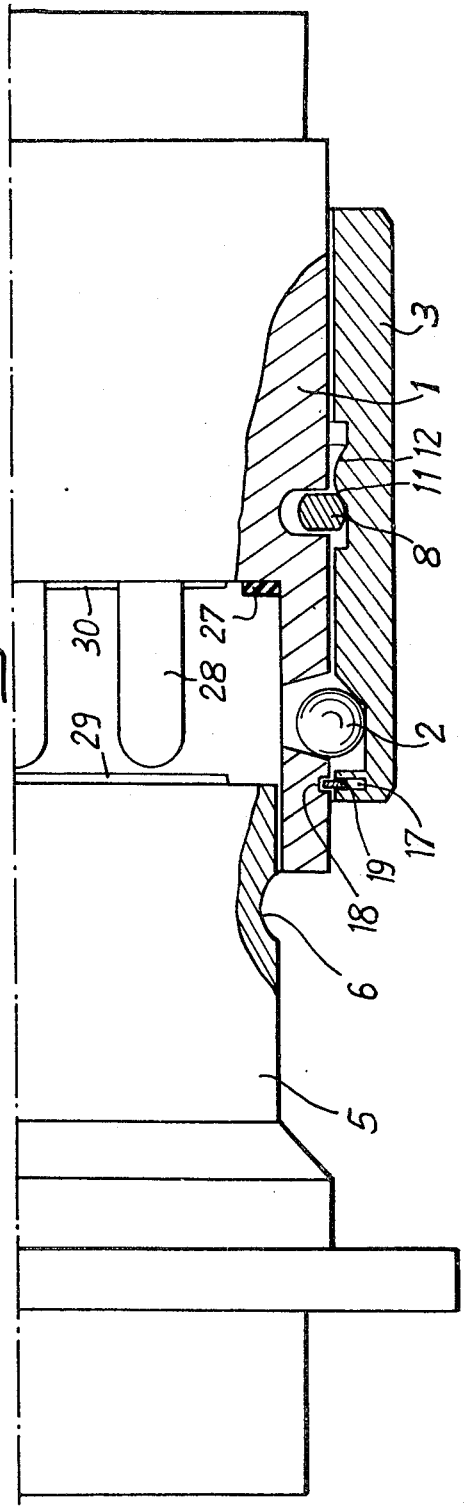
Fig. 3
Fig. 4

PUSH PULL CONNECTOR

This invention relates to connectors generally known as "push-pull" type connectors, that is to say connectors in which the coupling and uncoupling manoeuvres are obtained respectively by a pushing action or pulling action applied to a movable part in relation to a fixed part without any torsional or rotational movement.

For the purpose of this description the movable part will be called the "sleeve" into which the fixed part, called the "spigot" is inserted. Of course, in respect of the actual coupling parts themselves, the movable part may be provided with spigots or studs acting in conjunction with sleeves or sockets on the fixed part or inversely, as for example in the case of an electrical connector.

In many connectors of this type the coupling between the movable part and the fixed part is often effected by balls located in the movable part, held in place by a sliding member sliding along the movable part, which works in conjunction with recesses in the fixed part. The requirements of safety and reliability which this type of mechanism has to meet with on account of its applications (aeronautical, aerospace, machinery) and the loads (acceleration, vibration) to which it is subjected has led to the design and manufacture of mechanisms with two set positions, one locked position, in which the balls are located in their recesses, the sliding member being held in the locked position by spring action, and one unlocked position in which the balls are retracted, for example, by means of a sleeve sliding along the movable part, also held by springs. It is in fact essential that any acceleration or vibration to which the connector is subject must not cause unlocking to take place and it is also essential, once the mechanism is uncoupled, that the balls will not prevent a recoupling manoeuvre and that they are able tor remain in the rearming position, that is to say retracted, until such time as they are once again in line with their respective locations with which they work in conjunction to effect a new locking manoeuvre.

All these above conditions lead to complicated mechanisms in which the effects of the locking and rearming springs are constantly working against each other by their individual actions on the balls through the medium of either the sliding member or the rearming sleeve. This causes considerable and rapid wear and uncertain operation. The result is a mechanism which does not last long in service and which is not reliable.

Furthermore the presence of a rearming sleeve between the movable and fixed parts leads to clearances in the sliding action which, when added together, give the movable part overall excess play in relation to the fixed part and the guiding becomes insufficiently accurate.

Thus, for example, the number of coupling and uncoupling tests achieved without incident or noticeable wear has risen from 100 to 5000.

According to the present invention there is provided a connector comprising a sleeve, at least one locking ball mounted on the sleeve, a spigot provided with a recess for engagement by said at least one ball, a tubular sliding member slidably mounted on the sleeve for movement between a first position in which said at least one ball may move out of engagement with said recess and a second position in which the sliding member maintains said at least one ball in engagement with said recess to lock said sleeve to said spigot, an external circumferential groove in the sleeve in which a resilient annular ring is at least in part located, two circumferential grooves in the sliding member, the grooves being separated by two inclined surfaces engageable by the annular ring, the said grooves determining the first and second positions of the sliding member and the inclined surfaces being shaped, in correlation with the resilient force of the annular ring, such that the sliding member will move from one of said first and second positions to the other upon application of a force of the sliding member, and means for limiting the travel of the sliding member relative to the sleeve in both directions, the sliding member including a circumferential groove having a depth at least equal to the difference between the diameter of the at least one ball and the thickness of the sleeve, this groove being located such that it is adjacent the at least one ball when the sliding member is in the first position, the internal diameter of the portion of the sliding member adjacent the at least one ball being only slightly greater than the external diameter of the sleeve in all other positions of the sliding member.

Preferably the resilient ring is provided with flat side faces which co-operate with the edges of the grooves on the sliding member to limit travel of the sliding member relative to the sleeve. Means may be provided to hold the sliding member in the first position when the spigot is not engaged in the sleeve. These means may comprise two grooves located respectively on the external wall of the movable part and the internal wall of the sliding member, the said grooves facing one another when the sliding member is in the first position, and a spring blade which is located resiliently astride the said grooves when the sliding member is in the first position. The spigot in this case includes a boss which engages a tag on the said spring blade to push the latter up when the spigot is engaged in the sleeve, which action frees the sliding member.

Means, for example dogs or teeth, may be provided on the sliding member and sleeve respectively to prevent the relative rotation of the two components when the sliding member is in the first position. A seal may be provided in the sleeve against which the end of the spigot comes to rest.

Preferably, the inclined surfaces are asymmetrical, one of the surfaces being designed such that movement of the sliding member from the first to the second position requires a force slightly greater overall than the force necessary to fully engage the spigot and the sleeve and the other of the surfaces being designed such that movement of the sliding member from the second to the first position requires a force slightly greater than the forces exerted on the sliding member during service due to accelerations, vibration and deflexion.

The invention will be better understood from the following description of preferred embodiments thereof, given by way of example only, reference being had to the accompanying drawings, wherein:

FIG. 1 is a longitudinal half section illustrating an embodiment of connector according to the invention in the locked position;

FIG. 2 is a view similar to FIG. 1 showing the connector in the unlocked position;

FIGS. 3 and 4 are views of a second embodiment of the invention;

Figure 5:
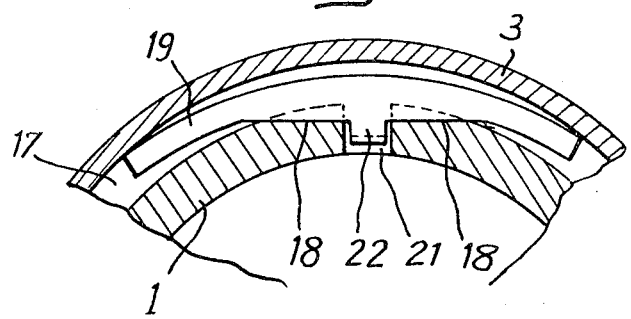
FIGS. 5 and 6 are respectively transverse and longitudinal part sections of the mechanism in FIGS. 3 and 4, showing the rearming system.
Figure 6:
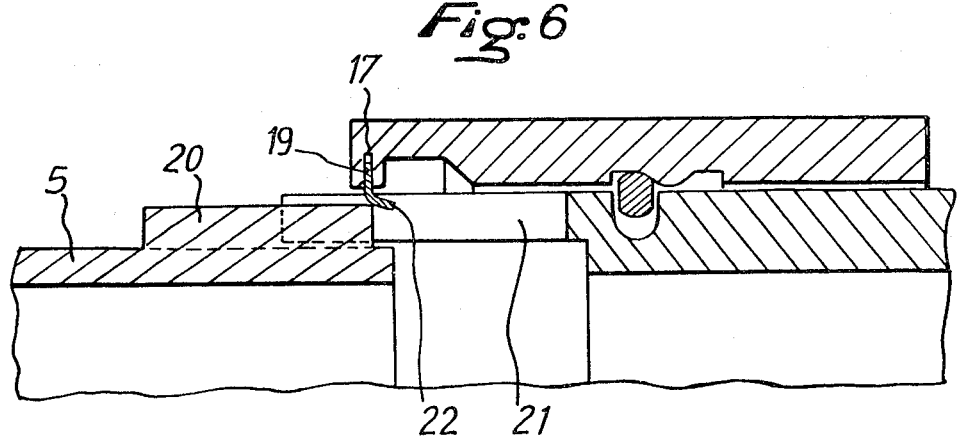

The connector shown in FIGS. 1 and 2 comprises a movable part 1 in the form of a sleeve containing balls 2 whose diameter is greater than the thickness of the sleeve whereby the balls 2 are able to lie proud of the interior of movable part 1 particularly when they are pushed back in by a sliding member 3. The slots 4 in which the balls located are conical and thus restrict the movement of balls 2 towards the interior of movable part 1. The connector also includes a fixed part 5, in the form of a spigot, able to enter movable part 1. The fixed part 5 has seats or locations into which the balls fall when they are in the locked position (FIG. 1). A sliding member 3 is provided to hold the balls in this position so that movable part 1 cannot be withdrawn from fixed part 5.

In FIGS. 1 and 2, only the fixed and movable parts of the connector housing have been shown and not the internal parts, plugs, pins, sockets or the like which differ from one connector to another and which depend on the intended use of the connector. In the case where a connector is intended to be used for the passage of fluids, the fixed and movable parts can remain empty and form fluid conduits. However, where an electrical connection is intended, they may be fitted with pins and sockets, the pins being located in either the fixed part or the movable part.

Movable part 1 has an external circumferential groove 7 in which a resilient annular ring 8 is located. When the said annular ring is in the compressed state it cannot protrude in practice out of groove 7. Annular ring 8, by virtue of its resilience, presses against the internal face of sliding member 3, the latter having two circumferential grooves 9 and 10 separated by two oppositely inclined surfaces 11 and 12 arranged back to back. Grooves 9 and 10 determine the two set positions for sliding member 3 and to move from one position to the other a longitudinal force must be applied to the sliding member which is sufficient to ensure compression of the annular ring. The force necessary to do this is determined by the resilience of annular ring 8 and by the slope of inclined surfaces 11 and 12.

Stops incorporated in sliding member 3 and movable part 1 restrict the travel of the sliding member. The stops are formed by a flange 13, one face of which co-operates with a face 14 on the internal wall of sliding member 3 to restrict travel in one direction, and another face of which co-operates with a component 15 fixed to sliding member 3 to restrict travel in the other direction.

In addition sliding member 3 comprises a circumferential groove at 16 which is adjacent the balls when the sliding member is in one of its set positions (FIG. 2). This groove is both deep enough and wide enough to allow the balls to move freely inside the space formed by slots 4 and groove 16 without presenting a protuberance on the inside of movable part 1. With the balls located in this space the connector is in its unlocked condition. In all other positions of the sliding member the internal diameter of the sliding member in line with the balls is very nearly equal to the external diameter of movable part 1.

The above described connector offers the advantage that the forces to which the fixed and movable parts are subjected during the locking operations are not transmitted via the balls. The forces are distributed over the periphery of annular ring 8 and inclined surfaces 11 and 12, that is to say over a relatively large surface area. Thus little wear occurs and, furthermore, such wear as does occur does not take place on the edges of locations 6 and 4 or in groove 16. It should be noted in this respect that balls are commonly made of steel whereas the fixed and movable parts may be made of aluminium and are therefore very subject to wear. This gives the mechanism a much longer service life, the number of operations effected without fault increasing from about 100 as is common in prior art devices to about 5000 or more. In fact, in the unlocked position, the balls remain free in groove 16 until such time as sliding member 3 moves from the unlocked position to the locked position, and inclined surfaces 11 and 12 are able to locate themselves in correlation with the resilient characteristics of annular ring 8 in such a manner that this moment occurs only after locations 6 are opposite slots 4.

In the locked position the balls remain completely confined in their location until sliding member 3 moves smartly from one set position to the other, at which time they are immediately released. No intermediate position exists in which the balls are half pressed in or half released and half entered into groove 16.

The operating clearance between sliding member 3 and movable part 1 can be reduced on account of the absence of an intermediate sleeve. The guiding process is therefore improved thus ensuring better resistance to vibration.

In the second embodiment of connector illustrated in FIGS. 3 to 6 the annular ring 8 has flat side faces which co-operate with the extreme edges 14 and 15 of grooves 9 and 10 to form stops restricting the to and fro movement of sliding member 3. Edges 14 and 15 are parallel to the side faces on annular ring 8.

Two grooves or recesses 17 and 18 are provided located respectively in sliding member 3 and in movable part 1 so as to be facing each other when the sliding member is in the unlocked position (FIG. 4). A resilient strip or blade 19 is fitted astride grooves 17 and 18 and this locks sliding member 3 in relation to movable part 1. Fixed part 5 has a boss 20 (FIG. 6), a longitudinal recess 21 being provided for it in movable part 1. The strip 19 has a tag 22 which is pushed upwards (FIGS. 5 and 6) as soon as movable part 1 is engaged over fixed part 5, thus causing strip 19 to enter groove 17 and release it from groove 18. Sliding member 3 is then unlocked in relation to movable part 1 (FIG. 4).

This arrangement prevents sliding member 3 being placed in the locked position if fixed part 5 is not engaged, thus preventing any abortive locking attempt.

Figure 7:
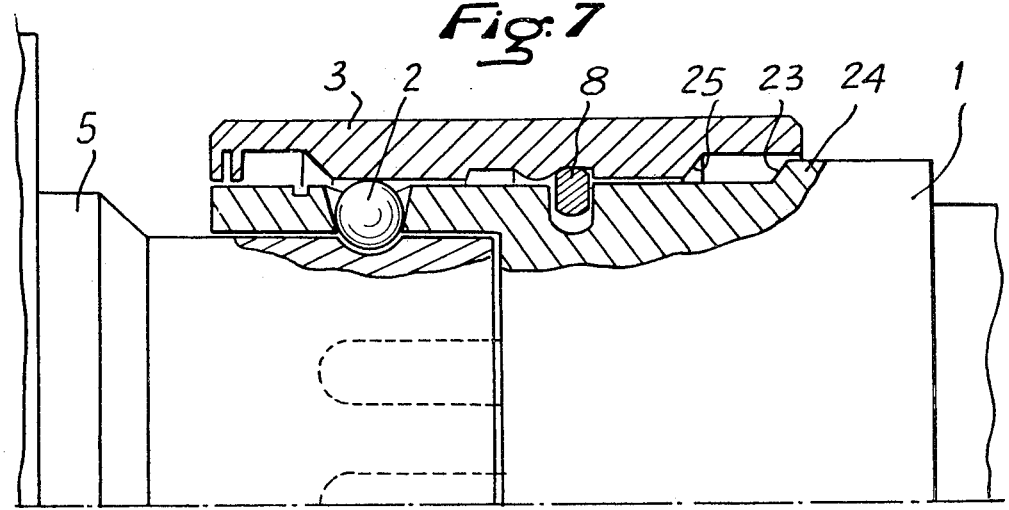
FIG. 7 illustrates the manual unlocking control system in longitudinal section.

In the arrangement of FIG. 7 means are provided on movable part 1 and sliding member 3 which, in the unlocked position, work together to prevent any rotation of sliding member 3 about movable part 1. In the example shown the said means comprise teeth 23 on the end of shoulder 24 on movable part 1 which work in conjunction with teeth machined in sliding member 3. The said teeth enmesh when sliding member 3 is in the unlocked position whereas, in the locked position, they are some distance apart. This arrangement constitutes a safety device which enables the operator to check for himself manually that the mechanism is unlocked; as long as sliding member 3 is unable to rotate about movable part 1 the connector is not locked. As soon as rotation is possible this means that the connector is locked.

In FIGS. 1 to 4 a seal 27 is shown in the movable part. This seal is compressed in the locked position and it ensures that the connector is sealed. The movable part of the connector of FIGS. 3 and 4 is provided with pins 28 which, in the locked condition, are engaged in corresponding sockets in the fixed part of the connector.

The forces required to effect the coupling and uncoupling actions are different. When coupling up it is necessary to push pins 28 into their sockets until end faces 29 and 30 make contact. The said end faces are often made of rubber or similar material and must be compressed. Finally the seal 27 must be compressed.

Inclined surface 11 and the resilient characteristics of annular ring 8 are designed so that sliding member 3 cannot go beyond its unstable position of equilibrium unless the said forces have been overcome, thus, at that moment, balls 2 are opposite locations 6 and they exert no force at all on the edges of the said locations when they are pushed in by sliding member 3.

Forces having a tendency to cause unlocking are forces due to accelerations which act on the sliding member, also forces due to vibration and deflexion. Inclined surface 12 is designed so that the resistance to unlocking is greater than these forces.

A margin of from 10% to 20% has been allowed for when calculating the inclination of surfaces 11 and 12.

What is claimed is:

1. A connector comprising a sleeve, a spigot for interfitting with said sleeve, a locking ball mounted on said sleeve, a recess on said spigot for engagement by the ball, a tubular member axially slidably mounted on said sleeve for travel in opposite directions between a first and a second position relative to said sleeve, the outer face of said sleeve having an annular ring of compressible material mounted thereon, a pair of spaced circumferential grooves separated by a projection formed on the inner surface of said slidable member, said projection having a peaked central area and oppositely inclined surfaces on each side thereof, means on said sleeve for locking the ball in the recess on the spigot when the sleeve is in said second position relative to said slidable member and unlocking the ball from the recess when in said first position, said peaked area of the projection engaging the compressible ring in an unstable manner so that it compresses the ring and rides thereover to place the ring in one of said pair of grooves to determine the first position of the slidable member and to place the ring in the other of said pair of grooves to determine the second position of the slidable member.

2. A connector as in claim 1 further comprising interengaging means on said sleeve and said slidable member to limit the travel of the slidable member in both directions.

3. A connector as in claim 1 wherein the locking means comprises a circumferential groove formed on the inner surface of the slidable member, said groove having a depth at least equal to the difference between the diameter of the ball and the thickness of the sleeve, said ball being located in said groove when said slidable member is in said first position and said ball being urged into the spigot recess by the inner face of the slidable member when the slidable member is in the second position.

4. A connector according to claim 1 further comprising means on the slidable member and sleeve to prevent the relative rotation of the two only when the slidable member is in the first position.

5. A connector according to claim 1 further comprising seal means carried by the sleeve against which the end of the spigot comes to rest.

6. A connector comprising a sleeve, a spigot for interfitting with said sleeve, a locking ball mounted on said sleeve, a recess on said spigot for engagement by the ball, a tubular member axially slidably mounted on said sleeve for travel in opposite directions between a first and a second position, one of the outer face of said sleeve and the inner face of the slidable member having a resilient annular ring with flat side faces mounted thereon and the other formed with a pair of spaced circumferential grooves separated by a projection having a central area and oppositely inclined surfaces on each side thereof, means on said sleeve for locking the ball in the recess on the spigot when the sleeve is in said second position and unlocking the ball from the recess when in said first position, said projection engaging the resilient ring in an unstable manner so that it rides thereover to place the ring in one of said pair of grooves to determine the first position of the slidable member and to place the ring in the other of said pair of grooves to determine the second position of the slidable member, said flat side faces cooperating with the edges of the pair of grooves which are remote from the projection to limit the travel of the sliding member relative to the sleeve.

7. A connector comprising a sleeve, a spigot for interfitting with said sleeve, a locking ball mounted on said sleeve, a recess on said spigot for engagement by the ball, a tubular member axially slidably mounted on said sleeve for travel in opposite directions between a first and a second position, one of the outer face of said sleeve and the inner face of the slidable member having a resilient annular ring mounted thereon and the other formed with a pair of spaced circumferential grooves separated by a projection having a central area and oppositely inclined surfaces on each side thereof, means on said sleeve for locking the ball in the recess on the spigot when the sleeve is in said second position and unlocking the ball from the recess when in said first position, said projection engaging the resilient ring in an unstable manner so that it rides thereover to place the ring in one of said pair of grooves to determine the first position of the slidable member and to place the ring in the other of said pair of grooves to determine the second position of the slidable member, and interengaging means on said sleeve and slidable member to hold the slidable member in the first position when the spigot is disengaged from the sleeve.

8. A connector according to claim 7 wherein the interengaging means comprise a locking groove formed on the external wall of the sleeve, a mounting groove located in the internal wall of the slidable member, the said locking and mounting grooves facing one another when the slidable member is in the first position, and a spring blade in said mounting groove and fitting in the said locking groove to hold the sleeve in the first position, the spigot having a boss which engages a tag on the said spring blade to push the latter up into the mounting groove as the spigot is engaged in the sleeve which action frees the slidable member.

9. A connector comprising a sleeve, a spigot for interfitting with said sleeve, a locking ball mounted on said sleeve, a recess on said spigot for engagement by the ball, a tubular member axially slidably mounted on said sleeve for travel in opposite directions between a first and a second position, one of the outer face of said sleeve and the inner face of the slidable member having a resilient annular ring mounted thereon and the other formed with a pair of spaced circumferential grooves separated by a projection having a central area and oppositely inclined asymmetrical surfaces on each side thereof, means on said sleeve for locking the ball in the recess on the spigot when the sleeve is in said second position and unlocking the ball from the recess when in said first position, said projection engaging the resilient ring in an unstable manner so that it rides thereover to place the ring in one of said pair of grooves to determine the first position of the slidable member and to place the ring in the other of said pair of grooves to determine the second position of the slidable member, one of said oppositely inclined surfaces being shaped such that movement of the sliding member from the first to the second position requires a force slightly greater overall than the force necessary to fully engage the spigot and the sleeve and the other of the surfaces being shaped such that movement of the sliding member from the second to the first position requires a force slightly greater than the forces normally exerted on the sliding member during service due to acceleration, vibration and deflexion.

10. A connector according to claim 9 wherein the inclined surfaces are shaped such that forces necessary to move the sliding member are from 10% to 20% above the aforementioned loads.

* * * * *